United States Patent
Attias et al.

(10) Patent No.: US 7,454,336 B2
(45) Date of Patent: Nov. 18, 2008

(54) VARIATIONAL INFERENCE AND LEARNING FOR SEGMENTAL SWITCHING STATE SPACE MODELS OF HIDDEN SPEECH DYNAMICS

(75) Inventors: Hagai Attias, Seattle, WA (US); Li Deng, Sammamish, WA (US); Leo J. Lee, Waterloo (CA)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 10/600,798

(22) Filed: Jun. 20, 2003

(65) Prior Publication Data

US 2004/0260548 A1    Dec. 23, 2004

(51) Int. Cl.
*G10L 15/00* (2006.01)
*G10L 15/28* (2006.01)
*G10L 15/14* (2006.01)

(52) U.S. Cl. .................. 704/240; 704/242; 704/255; 704/256.1; 704/256.4; 704/256.7

(58) Field of Classification Search ............. 704/256, 704/240, 242
See application file for complete search history.

(56) References Cited

U.S. PATENT DOCUMENTS

| | | | |
|---|---|---|---|
| 5,440,661 A * | 8/1995 | Papcun | 704/232 |
| 5,625,748 A * | 4/1997 | McDonough et al. | 704/251 |
| 6,052,662 A * | 4/2000 | Hogden | 704/256.2 |
| 6,249,763 B1 | 6/2001 | Minematsu | |
| 6,539,353 B1 | 3/2003 | Jiang et al. | |
| 6,622,119 B1 | 9/2003 | Ramaswamy et al. | |
| 6,629,073 B1 | 9/2003 | Hon et al. | |
| 6,633,857 B1 | 10/2003 | Tipping | |

OTHER PUBLICATIONS

Ma et al, "A MIxture Linear Model with Target-Directed Dynamics for Spontaneous Speech Recognition", IEEE International Conference on Acoustics, Speech, and Signal Processing, ICASSP'02, vol. 1, pp. I-961-I-964.*

Richards et al, "Vocal Tract Shape Trajectory Estimation Using MLP Analysis-by-Synthesis", IEEE International Conference on Acoustics, Speech, and Signal Processing, ICASSP-97, vol. 2, pp. 1287-1290.*

(Continued)

*Primary Examiner*—Richemond Dorvil
*Assistant Examiner*—Dorothy S Siedler
(74) *Attorney, Agent, or Firm*—Amin, Turocy & Calvin, LLP

(57) ABSTRACT

A system and method that facilitate modeling unobserved speech dynamics based upon a hidden dynamic speech model in the form of segmental switching state space model that employs model parameters including those describing the unobserved speech dynamics and those describing the relationship between the unobserved speech dynamic vector and the observed acoustic feature vector is provided. The model parameters are modified based, at least in part, upon a variational learning technique. In accordance with an aspect of the present invention, novel and powerful variational expectation maximization (EM) algorithm(s) for the segmental switching state space models used in speech applications, which are capable of capturing key internal (or hidden) dynamics of natural speech production, are provided. For example, modification of model parameters can be based upon an approximate mixture of Gaussian (MOG) posterior and/or based upon an approximate hidden Markov model (HMM) posterior using a variational technique.

21 Claims, 10 Drawing Sheets

OTHER PUBLICATIONS

Picone et al, "Initial Evaluation of Hidden Dynamic Models on Conversational Speech", IEEE International Conference on Acoustics, Speech, and Signal Processing, ICASSP'99, vol. 1, pp. 109-112.*

M. Ostendorf, V. V. Digalakis, and O. A. Kimball, From HMMs to Segment Models: A Unified View of Stochastic Modeling for Speech Recognition, IEEE Trans. Speech Audio Process, vol. 4, No. 5, 1996. pp. 360-378.

Z. Ghahramani and G. E. Hinton, Variational Learning for Switching State-Space Models, Submitted to Neural Computation, vol. 12, 2000. pp. 831-864.

H. B. Richards and J. S. Bridle, The HDM: A Segmental Hidden Dynamic Model of Coarticulation, Proc. ICASSP, Phoenix, 1999, pp. 357-360.

K. Reinhard and M. Niranjan, Diphone subspace mixture trajectory models for HMM complementation, Speech Communications, vol. 38, 2002, pp. 237-265.

V. Pavlovic, B. J. Frey and T. S. Huang, Variational Learning in Mixed-State Dynamic Graphical Models, in Proc. UAI, Stockholm, 1999, pp. 522-530.

L. J. Lee, P. Fieguth and L. Deng, A Functional Articulatory Dynamic Model for Speech Production, in Proc. ICASSP, Salt Lake City, 2001, pp. 797-800.

J. Z. Ma and L. Deng, A path stacked algorithm for optimizing dynamic regimes in a statistical hidden dynamic model of speech, Computer, Speech and Languages, vol. 14, 2000, pp. 101-114.

L. Deng and J. Ma, Spontaneous speech recognition using a statistical coarticulatory model for the vocal-tract-resonance dynamics, J. Acous. Soc. Am., vol. 108, No. 6, 2000, pp. 3036-3048.

* cited by examiner

VARIATIONAL INFERENCE AND LEARNING FOR SEGMENTAL SWITCHING STATE SPACE MODELS OF HIDDEN SPEECH DYNAMICS

TECHNICAL FIELD

The present invention relates generally to systems and methods for recovering or recognizing the phone or word sequence from the acoustic data of speech, and, more particularly to variational inference and learning applied to segmental switching state space models of hidden speech dynamics that is used to do phone or word recognition.

BACKGROUND OF THE INVENTION

The goal of human speech production is to convey discrete linguistic symbols corresponding to the intended message, while the actual speech signal is produced by the continuous and smooth movement of the articulators with lots of temporal structures. This seemingly contradictory dual nature (discrete vs. continuous) of speech can be amazingly utilized by human speech recognizers in a beneficial way to enhance the decoding of the underlying message from acoustic signals. However, so far this has been a serious challenge for acoustic modeling in both scientific research and practical applications.

The conventional hidden Markov models (HMMs) used in the state-of-the-art speech technology, albeit putting enough emphasis on the symbolic nature of speech, have long been recognized to model the temporal dynamics very poorly, which result in some inherent weaknesses of the current speech technology built upon it. Efforts have since been made to improve the modeling of temporal dynamics and the ultimate goal is to turn the coarticulation behavior in natural speech from a curse (as in current speech technology) to a blessing. Currently there are two general trends in the speech research community to reach this goal: one is to extend upon HMM to better account for the temporal dynamics in acoustic signals directly, the other is to use some kind of hidden dynamics, abstract or physically meaningful, to account for the temporal dynamics and subsequently map it to the acoustic domain. The HMM extensions typically enjoy the benefit of being able to use the standard HMM training and test algorithms with some generalization, but have more model parameters and need more computation. The temporal dynamics at the surface acoustic level is also very noisy and difficult to extract. The hidden dynamic models (HDMs) are able to directly model the underlying dynamics with a parsimonious set of parameters and closer to the models developed in speech science, but they typically require the derivation of new training and test algorithms with various degrees of difficulty.

By way of additional background, in speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector represents a section of the speech signal.

The feature vectors can represent any number of available features extracted through known feature extraction methods such as Linear Predictive Coding (LPC), LPC-derived cepstrum, Perceptive Linear Prediction (PLP), auditory model, and Mel-Frequency Cepstrum Coefficients (MFCC).

The feature vectors are applied to an acoustic model that describes the probability that a feature vector was produced by a particular word, phoneme, or senone. Based on a sequence of these probabilities, a decoder identifies a most likely word sequence for the input speech signal.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later. A2

The present invention provides for a system and method that facilitate modeling speech dynamics based upon a speech model, called the segmental switching state space model, that employs model parameters that characterize some aspects of the human speech articulation process. These model parameters are modified based, at least in part, upon a variational learning technique.

In accordance with an aspect of the present invention, novel and powerful variational expectation maximization (EM) algorithm(s) for the segmental switching state space models used in speech applications, which are capable of capturing key internal (or hidden) dynamics of natural speech production, are provided. Hidden dynamic models (HDMs) have recently become a class of promising acoustic models to incorporate crucial speech-specific knowledge and overcome many inherent weaknesses of traditional HMMs. However, the lack of powerful and efficient statistical learning algorithms is one of the main obstacles preventing them from being well studied and widely used. Since exact inference and learning are intractable, a variational approach is taken to develop effective approximate algorithms. The present invention implements the segmental constraint crucial for modeling speech dynamics and provides algorithms for recovering hidden speech dynamics and discrete speech units from acoustic data only. Further, the effectiveness of the algorithms developed is verified by experiments on simulation and Switchboard speech data.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
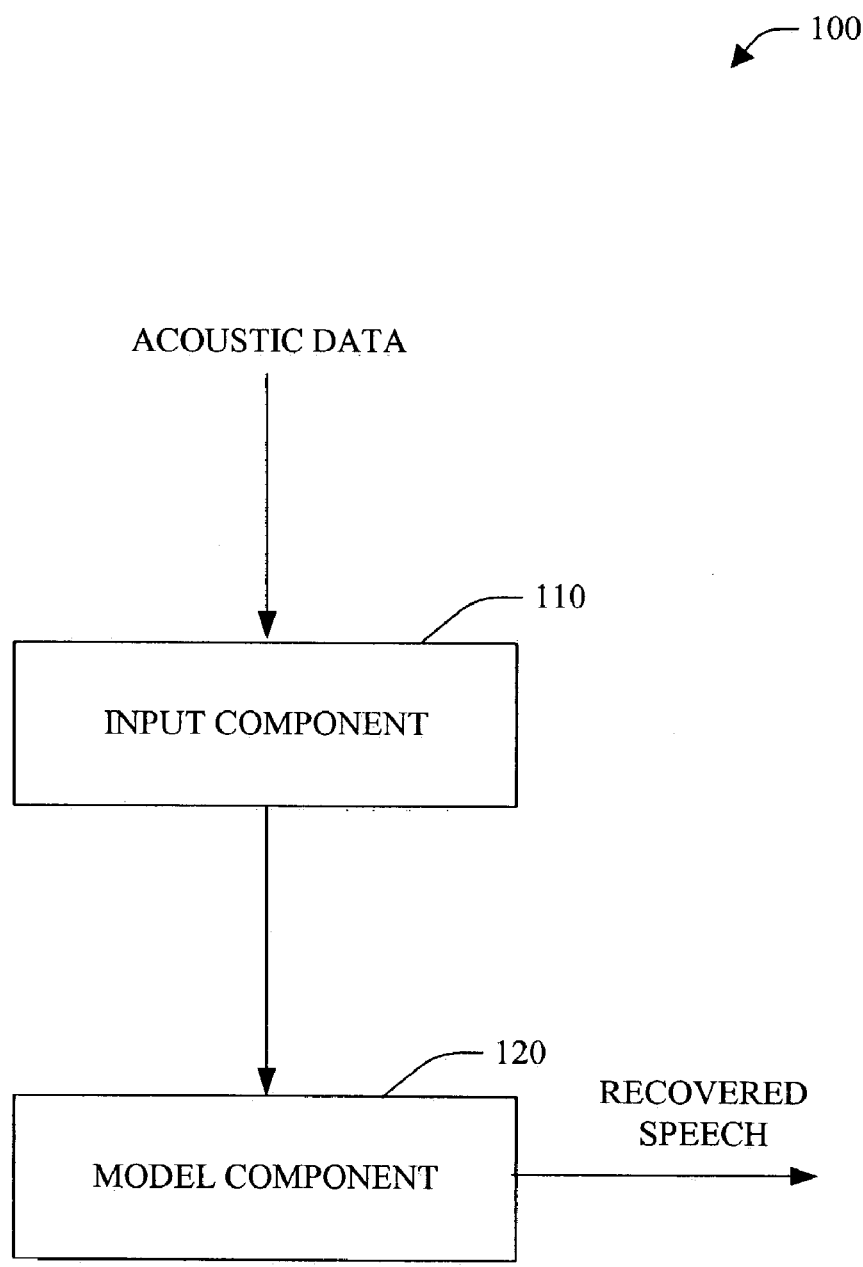
FIG. 1 is a block diagram of a system that facilitates modeling speech dynamics in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a system 100 that facilitates modeling speech dynamics in accordance with an aspect of the present invention is illustrated. The system 100 models speech dynamics based upon a speech model that employs model parameters including the parameters which characterize aspects of the unobserved dynamics in speech articulation and the parameters which characterize the mapping relationship from the unobserved dynamic variables to the observed speech acoustics. The model parameters are modified based, at least in part, upon a variational learning technique.

The system 100 can utilize powerful variational expectation maximization (EM) algorithm(s) for the segmental switching state space models used in speech applications, which are capable of capturing key internal (or hidden) dynamics of natural speech production. The system 100 overcomes inherent weakness of traditional HMMs by employing efficient statistical learning algorithm(s). Since exact inference and learning are intractable, in accordance with an aspect of the present invention, the system 100 utilizes a variational approach to develop effective approximate algorithms. Thus, the system can implement the segmental constraint crucial for modeling speech dynamics and provides algorithms for recovering hidden speech dynamics and discrete speech units from acoustic data only.

The system 100 includes an input component 110 that receives acoustic data. For example, the input component 110 can convert an analog speech signal into a series of digital values. The system further includes a model component 120 that models speech. The model component 120 receives the acoustic data from the input component 110. The model component 120 then recovers speech from the acoustic data based, at least in part, upon a model having model parameters including the parameters which characterize aspects of the unobserved dynamics in speech articulation and the parameters which characterize the mapping relationship from the unobserved dynamic variables to the observed speech acoustics. The model parameters are modified based, at least in part, upon a variational learning technique as discussed below.

In one example, the model component 120 employs an HDM in a form of switching state-space models for speech applications. The state equation and observation equation are defined to be:

$$x_n = A_s x_{n-1} + (I - A_s) u_s + w, \quad (1)$$

$$y_n = C_s x_n + c_s + V, \quad (2)$$

where n and s are frame number and phone index respectively, x is the hidden dynamics and y is the acoustic feature vector (such as MFCC). For example, the hidden dynamics can be chosen to be the articulatory variables, or to be the variables for the vocal-tract-resonances (VTRs) which are closely related to the smooth and target-oriented movement of the articulators. The state equation (1) is a linear dynamic equation with phone dependent system matrix $A_s$ and target vector $u_s$ and with built-in continuity constraint across the phone boundaries. The observation equation (2) represents a phone-dependent VTR-to-acoustic linear mapping. The choice of linear mapping is mainly due to the difficulty of algorithm development. The resulting algorithm can also be generalized to mixtures of linear mapping and piece-wise linear mapping within a phone. Further, Gaussian white noises w and v can be added to both the state and observation equations to make the model probabilistic. C and c represent the parameters responsible for the mapping from the VTRs to the acoustic feature vector.

To facilitate algorithm development, the HDM is also expressed in terms of probability distributions:

$$p(s_n = s | s_{n-1} = s') = \pi_{s's},$$

$$p(x_n | s_n = s, x_{n-1}) = N(x_n | A_s x_{n-1} + a_s, B_s),$$

$$p(y_n | s_n = s, x_n) = N(y_n | C_s x_n + c_s, D_s), \quad (3)$$

where $\pi_{s's}$ is the phone transition probability matrix, $a_s = (I - A_s) u_s$ and N denotes a Gaussian distribution with mean and precision matrix (inverse of the covariance matrix) as the parameters, and, D represents the duration parameter(s). The joint distribution over the entire time sequence is given by $$p(y_{1:N}, x_{1:N}, s_{1:N}) = \prod_n p(y_n | s_n, x_n) p(x_n | s_n, x_{n-1}) p(s_n | s_{n-1}). \quad (4)$$

Figure 2:
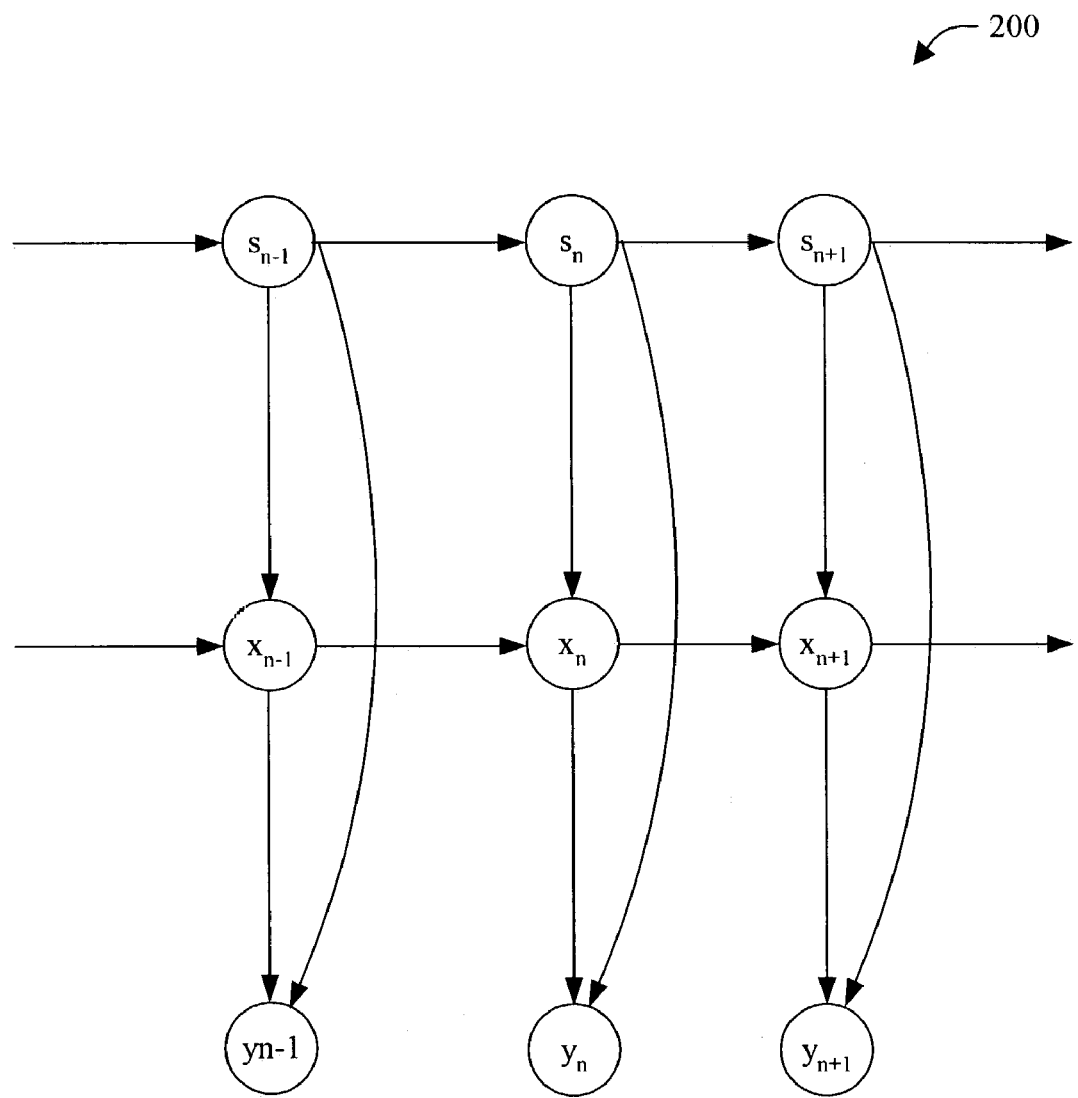
FIG. 2 is a graphical representation of conditional independence relations of the model in accordance with an aspect of the present invention.

The conditional independence relations of the model can be seen more clearly from a graphic form (Bayesian network) as shown in FIG. 2.

Model Inference and Learning

Inference refers to the calculation of posterior distribution $p(s_{1:N}, x_{1:N}|y_{1:N})$ (where $s_{1:N}=s_1, s_2, \ldots s_N$ is a sequence of phones of length N) given all model parameters, while learning refers to the estimation of model parameters $\theta=\{A_{1:S}, a_{1:S}, B_{1:S}, C_{1:S}, c_{1:S}, D_{1:S}\}$ given the complete distribution, usually in a maximum likelihood (ML) sense. Under the expectation-maximization (EM) framework, inference is the E step and learning is the M step. With regard to the system 100, however, the posterior of the model turns out to be a Gaussian mixture whose number of components is exponential in the total number of frames, and is therefore computationally intractable.

Thus, in accordance with an aspect of the present invention, an approximation is employed. In one example, a mixture of Gaussian (MOG) posterior based on variational technique(s) is employed as an approximation. In another example, a hidden Markov model (HMM) posterior based on variational techniques is employed as an approximation. Those skilled in the art will recognize that the present invention is not limited to approximations employing MOG and/or HMM posteriors. Thus, any suitable approximation technique employing the switching state space model can be employed in the system 100.

The idea is to choose the approximate posterior q to approximate the true posterior $p(s_{1:N}, X_{1:N} | Y_{1:N})$ with a sensible and tractable structure and optimize it by minimizing its Kullback-Liebler (KL) distance to the exact posterior. It turns out that this optimization can be performed efficiently without having to compute the exact (but intractable) posterior.

In one example, in contrast to previous approaches, the system 100 uses soft phone assignments that are estimated under a unified EM framework; however, the approximation doesn't factorize s from x and results in a multimodal posterior over x instead of a unimodal one, which is justifiably more suitable for speech applications.

MOG Posterior

As discussed previously, in one example, the system 100 employs an approximation based, at least in part, upon a mixture of Gaussian (MOG) posterior. Under this approximation q is restricted to be:

$$q(s_{1:N}, x_{1:N}) = \prod_n q(x_n | s_n) q(s_n), \quad (5)$$

For purposes of brevity, the dependence of the q's on the observation y is omitted but always implied.

Minimizing the KE divergence between q and p is equivalent to maximizing the following function F, $$F[q] = \sum_{s_{1:N}} \int dx_{1:N} q(s_{1:N}, x_{1:N}) \cdot [\log p(y_{1:N}, x_{1:N}, s_{1:N}) - \log q(s_{1:N}, x_{1:N})], \quad (6)$$

which is also a lower bound of the likelihood function and will be subsequently used as the objective function in the learning (M) step.

By taking calculus of variation to optimize F with respect to $q(x_n|s_n)$ and $q(s_n)$, it turns out that each component $q(x_n|s_n)$ follows a Gaussian distribution:

$$q(x_n|s_n=s)=N(x_n|\rho_{s,n}, \Gamma_{s,n}), \quad (7)$$

and the parameters $\rho_{s,n}$ and $\Gamma_{s,n}$ are given by $$\Gamma_{s,n} = C_s^T D_s C_s + B_s + \sum_{s'} \gamma_{s',n+1} A_{s'}^T B_{s'} A_{s'}, \quad (8)$$

$$\Gamma_{s,n} \rho_{s,n} = B_s \left( A_s \sum_{s'} \gamma_{s',n-1} \rho_{s',n-1} + a_s \right) + \sum_{s'} \gamma_{s',n+1} A_{s'}^T B_{s'} (\rho_{s',n+1} - a_{s'}) + C_s^T D_s (y_n - c_s), \quad (9)$$

where $\gamma_{s,n} = q(s_n=s)$ and is computed from $$\log \gamma_{s,n} = f_1(\rho_{s,n}, \Gamma_{s,n}, \Theta) + f_2(\rho_{s',n-1}, \Gamma_{s',n-1}, \Theta) + f_3(\rho_{s',n+1}, \Gamma_{s',n+1}, \Theta). \quad (10)$$

$$f_1 = \frac{1}{2} \Big\{ \log \left| \frac{D_s}{2\pi} \right| - \log \left| \frac{\Gamma_{s,n}}{2\pi} \right| - < C_s^T D_s C_s, \Gamma_{s,n}^{-1} + \rho_{s,n} \rho_{s,n}^T > \\ - 2(c_s - y_n)^T D_s C_s \rho_{s,n} - (c_s - y_n)^T D_s (c_s - y_n) + < \Gamma_{s,n}, \\ \Gamma_{s,n}^{-1} + \rho_{s,n} \rho_{s,n}^T > -\rho_{s,n}^T \Gamma_{s,n} \rho_{s,n} + \log \left| \frac{B_s}{2\pi} \right| - < B_s, \\ \Gamma_{s,n}^{-1} + \rho_{s,n} \rho_{s,n}^T > +2 a_s^T B_s \rho_{s,n} - a_s^T B_s a_s \Big\}, \quad (11)$$

$$f_2 = \frac{1}{2} \sum_{s'} \gamma_{s',n-1} \{ - < A_s^T B_s A_s, \Gamma_{s',n-1}^{-1} + \rho_{s',n-1} \rho_{s',n-1}^T > \\ - 2(a_s - \rho_{s,n})^T B_s A_s \rho_{s',n-1} + 2 \log \pi_{s's} \}, \quad (12)$$

$$f_3 = \frac{1}{2} \sum_{s'} \gamma_{s',n+1} \Big\{ \log \left| \frac{B_{s'}}{2\pi} \right| - < A_{s'}^T B_{s'} A_{s'}, \\ \Gamma_{s,n}^{-1} + \rho_{s,n} \rho_{s,n}^T > -2(a_{s'} - \rho_{s',n+1})^T B_{s'} A_{s'} \rho_{s,n} - < B_{s'}, \\ \Gamma_{s',n+1}^{-1} + \rho_{s',n+1} \rho_{s',n+1}^T > \\ + 2 a_{s'}^T B_{s'} \rho_{s',n+1} - a_{s'}^T B_{s'} a_{s'} + 2 \log \pi_{ss'} \Big\}, \quad (13)$$

where <> denotes the element-wise product of two equal-size vectors or matrices.

Equations (8) and (9) are coupled linear equations given model parameters $\theta$ and $\gamma$'s can be solved efficiently by sparse matrix techniques. Equation (10) is a nonlinear equation by itself and is solved by iteration. Equations (8), (9) and (10) constitutes the inference or E step of the algorithm and are solved iteratively (e.g., all together after some proper initializations). Model learning involves taking derivatives of F with respect to the model parameters (e.g., all) and setting them to zero. This results in a set of linear equations which can be solved easily. Since this step is standard as to EM approaches with no special difficulties, the detail equations are omitted for purposes of brevity.

$$A_s = \left[\frac{1}{\sum_n \gamma_{s,n}} \left(\sum_n \gamma_{s,n}\rho_{s,n}\right)\left(\sum_n \gamma_{s,n}\sum_{s'}\gamma_{s',n-1}\rho_{s',n-1}\right)^T - \sum_n \gamma_{s,n}\rho_{s,n}\sum_{s'}\gamma_{s',n-1}\rho_{s',n-1}^T\right]. \quad (14)$$

$$\left[\frac{1}{\sum_n \gamma_{s,n}}\left(\sum_n \gamma_{s,n}\sum_{s'}\gamma_{s',n-1}\rho_{s',n-1}\right)\left(\sum_n \gamma_{s,n}\sum_{s'}\gamma_{s',n-1}\rho_{s',n-1}\right)^T - \sum_n \gamma_{s,n}\sum_{s'}\gamma_{s',n-1}(\Gamma_{s',n-1}^{-1} + \rho_{s',n-1}\rho_{s',n-1}^T)\right]^{-1}$$

$$a_s = \frac{1}{\sum_n \gamma_{s,n}}\left(\sum_n \gamma_{s,n}\rho_{s,n} - A_s\sum_n \gamma_{s,n}\sum_{s'}\gamma_{s',n-1}\rho_{s',n-1}\right), \quad (15)$$

$$B_s^{-1} = \frac{1}{\sum_n \gamma_{s,n}}\left\{\sum_n \gamma_{s,n}(\Gamma_{s,n}^{-1} + \rho_{s,n}\rho_{s,n}^T) - \left[\sum_n \gamma_{s,n}\rho_{s,n}\left(\sum_{s'}\gamma_{s',n-1}\rho_{s',n-1}\right)^T\right]A_s^T - \right. \quad (16)$$

$$\left(\sum_n \gamma_{s,n}\rho_{s,n}\right)a_s^T - A_s\left[\sum_n \gamma_{s,n}\left(\sum_{s'}\gamma_{s',n-1}\rho_{s',n-1}\right)\rho_{s,n}^T\right] + A_s\left[\sum_n \gamma_{s,n}\sum_{s'}\gamma_{s',n-1}(\Gamma_{s',n-1}^{-1} + \rho_{s',n-1}\rho_{s',n-1}^T)\right]A_s^T +$$

$$\left. A_s\left(\sum_n \gamma_{s,n}\sum_{s'}\gamma_{s',n-1}\rho_{s',n-1}\right)a_s^T - a_s\left(\sum_n \gamma_{s,n}\rho_{s,n}\right)^T + a_s\left[\sum_n \gamma_{s,n}\left(\sum_{s'}\gamma_{s',n-1}\rho_{s',n-1}\right)^T\right]A_s^T\right\} + a_s a_s^T,$$

$$C_s = \left[\frac{1}{\sum_n \gamma_{s,n}}\left(\sum_n \gamma_{s,n}y_n\right)\left(\sum_n \gamma_{s,n}\rho_{s,n}\right)^T - \sum_n \gamma_{s,n}y_n\rho_{s,n}^T\right]\cdot\left[\frac{1}{\sum_n \gamma_{s,n}}\left(\sum_n \gamma_{s,n}\rho_{s,n}\right)\left(\sum_n \gamma_{s,n}\rho_{s,n}\right)^T - \sum_n \gamma_{s,n}(\Gamma_{s,n}^{-1} + \rho_{s,n}\rho_{s,n}^T)\right]^{-1}, \quad (17)$$

$$c_s = \frac{1}{\sum_n \gamma_{s,n}}\left(\sum_n \gamma_{s,n}y_n - C_s\sum_n \gamma_{s,n}\rho_{s,n}\right), \quad (18)$$

$$D_s^{-1} = \frac{1}{\sum_n \gamma_{s,n}}\left\{\sum_n \gamma_{s,n}y_n y_n^T - \left(\sum_n \gamma_{s,n}y_n\rho_{s,n}^T\right)C_s^T - \left(\sum_n \gamma_{s,n}y_n\right)c_s^T - C_s\left(\sum_n \gamma_{s,n}y_n\rho_{s,n}^T\right)^T + \right. \quad (19)$$

$$\left. C_s\left[\sum_n \gamma_{s,n}(T_{s,n}^{-1} + \rho_{s,n}\rho_{s,n}^T)\right]C_s^T + C_s\left(\sum_n \gamma_{s,n}\rho_{s,n}\right)c_s^T + c_s\left(\sum_n \gamma_{s,n}y_n\right)^T + c_s\left(\sum_n \gamma_{s,n}\rho_{s,n}\right)^T C_s^T\right\} + c_s c_s^T.$$

HMM Posterior

As discuss previously, in another example, the system 100 employs an approximation based, at least in part, upon an HMM posterior. Under this approximation q is taken to be $$q(s_{1:N}, x_{1:N}) = \prod_{n=1}^N q(x_n|s_n)\cdot\prod_{n=2}^N q(s_n|s_{n-1})\cdot q(s_1). \quad (20)$$

First, two posterior transition probabilities are defined:

$$\eta_{s's,n} = q(s_n = s|s_{n-1} = s'), \quad (21)$$
$$\overline{\eta}_{s's,n} = q(s_n = s|s_{n+1} = s') = \frac{\eta_{s's,n+1}\gamma_{s,n}}{\gamma_{s',n+1}},$$

where $\gamma_{s,n}$ is defined to be the same as in the previous section. It turns out that each $q(x_n|s_n)$ is again a Gaussian distribution, and $\rho_{s,n}$ and $\Gamma_{s,n}$ are given by coupled linear equations having the same form as Equations (8) and (9), except that the $\gamma$'s are replaced by $\eta$'s and $\overline{\eta}$'s. These equations can again be solved by sparse matrix techniques. The $\gamma$'s and $\eta$'s themselves can be solved by the following efficient backward-forward procedure given the model parameters and all the $\rho$'s and $\Gamma$'s:

1. Initialize: $z_{s,N+1} = 1$ for all s.
2. Backward pass: for n=N, ..., 2

$$z_{s,n} = \sum_{s'}\exp(f_{ss',n})z_{s',n+1}, \quad (22)$$

$$\eta_{ss',n} = \frac{1}{z_{s,n}}\exp(f_{ss',n})z_{s',n+1}$$

3. For n=1:

$$z_1 = \sum_s \exp(f_{s,1})z_{s,2}, \quad (23)$$

$$\gamma_{s,1} = \frac{1}{z_1}\exp(f_{s,1})z_{s,2}.$$

4. Forward pass: for n=2, ..., N $$\gamma_{s,n} = \sum_{s'}\eta_{s's,n}\gamma_{s',n-1}. \quad (24)$$

$$f_{s's,n} = \frac{1}{2}\left\{\log\left|\frac{D_s}{2\pi}\right| - \langle C_s^T D_s C_s, \Gamma_{s,n}^{-1} + \rho_{s,n}\rho_{s,n}^T\rangle - \right. \quad (25)$$

$$2(c_s - y_n)^T D_s C_s \rho_{s,n} - (c_s - y_n)^T D_s(c_s - y_n) -$$

-continued $$\log\left|\frac{\Gamma_{s,n}}{2\pi}\right| + \langle \Gamma_{s,n}, \Gamma_{s,n}^{-1} + \rho_{s,n}\rho_{s,n}^T \rangle - \rho_{s,n}^T \Gamma_{s,n}\rho_{s,n} + \log\left|\frac{B_s}{2\pi}\right| -$$

$$\langle A_s^T B_s A_s, \Gamma_{s',n-1}^{-1} + \rho_{s',n-1}\rho_{s',n-1}^T \rangle -$$

$$2(a_s - \rho_{s,n})^T B_s A_s \rho_{s',n-1} - \langle B_s, \Gamma_{s,n}^{-1} + \rho_{s,n}\rho_{s,n}^T \rangle$$

$$2a_s^T B_s \rho_{s,n} - a_s^T B_s a_s + 2\log \pi_{s's} \},$$

$$f_{s,1} = \frac{1}{2}\{\log\left|\frac{D_s}{2\pi}\right| - \langle C_s^T D_s C_s, \Gamma_{s,1}^{-1} + \rho_{s,1}\rho_{s,1}^T \rangle - \tag{26}$$

$$2(c_s - y_1)^T D_s C_s \rho_{s,1} - (c_s - y_1)^T D_s (c_s - y_1) -$$

$$\log\left|\frac{\Gamma_{s,1}}{2\pi}\right| + \langle \Gamma_{s,1}, \Gamma_{s,1}^{-1} + \rho_{s,1}\rho_{s,1}^T \rangle - \rho_{s,1}^T \Gamma_{s,1}\rho_{s,1} + \log\left|\frac{B_s}{2\pi}\right| -$$

$$\langle B_s, \Gamma_{s,1}^{-1}\rho_{s,1}\rho_{s,1}^T \rangle + 2a_s^T B_s \rho_{s,1} - a_s^T B_s a_s + 2\log\pi_0 \}.$$

Again, f's presented above are functions of the $\rho$'s, $\Gamma$'s and of model parameters. It is to be appreciated that the complete E step still has to iterate between the calculation of $q(x_n|s_n)$ and $q(s_n|s_{n-1})$. The parameter learning is quite similar to the MOG case and the results are summarized below:

$$A_s = \left[\frac{1}{\sum_n \gamma_{s,n}}\left(\sum_n \gamma_{s,n}\rho_{s,n}\right)\left(\sum_n \sum_{s'} \eta_{s's,n}\gamma_{s',n-1}\rho_{s',n-1}\right)^T - \tag{27}$$

$$\sum_n \rho_{s,n}\sum_{s'} \eta_{s's,n}\gamma_{s',n-1}\rho_{s',n-1}^T\right] \cdot$$

$$\left[\frac{1}{\sum_n \gamma_{s,n}}\left(\sum_n \sum_{s'} \eta_{s's,n}\gamma_{s',n-1}\rho_{s',n-1}\right)\right.$$

$$\left(\sum_n \sum_{s'} \eta_{s's,n}\gamma_{s',n-1}\rho_{s',n-1}\right)^T -$$

$$\left.\sum_n \sum_{s'} \eta_{s's,n}\gamma_{s',n-1}(\Gamma_{s',n-1}^T + \rho_{s',n-1}\rho_{s',n-1}^T)\right]^{-1},$$

$$a_s = \frac{1}{\sum_n \gamma_{s,n}}\left(\sum_n \gamma_{s,n}\rho_{s,n} - A_s \sum_n \sum_{s'} \eta_{s's,n}\gamma_{s',n-1}\rho_{s',n-1}\right), \tag{28}$$

$$NB_s^{-1} = \sum_n \gamma_{s,n}(\Gamma_{s,n}^{-1} + \rho_{s,n}\rho_{s,n}^T) - \tag{29}$$

$$\left[\sum_n \rho_{s,n}\left(\sum_{s'} \eta_{s's,n}\gamma_{s',n-1}\rho_{s',n-1}^T\right)\right]A_s^T - \left(\sum_n \gamma_{s,n-1}\rho_{s,n}\right)a_s^T - A_s$$

$$= \left[\sum_n \left(\sum_{s'} \eta_{s's,n}\gamma_{s',n-1}\rho_{s',n-1}\right)\rho_{s,n}^T\right] +$$

$$A_s\left[\sum_n \sum_{s'} \eta_{s's,n}\gamma_{s',n-1}(\Gamma_{s',n-1}^{-1} + \rho_{s',n-1}\rho_{s',n-1}^T)\right]A_s^T + A_s$$

$$= \left(\sum_n \sum_{s'} \eta_{s's,n}\gamma_{s',n-1}\rho_{s',n-1}\right)a_s^T -$$

$$a_s\sum_n \gamma_{s,n}\rho_{s,n}^T a_s\left(\sum_n \sum_{s'} \eta_{s's,n}\gamma_{s',n-1}\rho_{s',n-1}\right)^T A_s^T +$$

$$\left(\sum_n \gamma_{s,n}\right)a_s a_s^T,$$

$$C_s = \left[\frac{1}{\sum_n \gamma_{s,n}}\left(\sum_n \gamma_{s,n}y_n\right)\left(\sum_n \gamma_{s,n}\rho_{s,n}\right)^T - \sum_n \gamma_{s,n}y_n\rho_{s,n}^T\right] \cdot \tag{30}$$

$$\left[\frac{1}{\sum_n \gamma_{s,n}}\left(\sum_n \gamma_{s,n}\rho_{s,n}\right)\left(\sum_n \gamma_{s,n}\rho_{s,n}\right)^T -\right.$$

$$\left.\sum_n \gamma_{s,n}(\Gamma_{s',n-1}^T + \rho_{s',n-1}\rho_{s',n-1}^T)\right]^{-1},$$

$$c_s = \frac{1}{\sum_n \gamma_{s,n}}\left(\sum_n \gamma_{s,n}y_n - C_s\sum_n \gamma_{s,n}\rho_{s,n}\right), \tag{31}$$

$$ND_s^{-1} = \sum_n \gamma_{s,n}y_n y_n^T - \left(\sum_n \gamma_{s,n}y_n\rho_{s,n}^T\right)C_s^T - \left(\sum_n \gamma_{s,n}y_n\right)c_s^T - \tag{32}$$

$$C_s\left(\sum_n \gamma_{s,n}y_n\rho_{s,n}^T\right)^T + C_s\left[\sum_n \gamma_{s,n}(\Gamma_{s,n}^{-1} + \rho_{s,n}\rho_{s,n}^T)\right]C_s^T +$$

$$C_s\left(\sum_n \gamma_{s,n}\rho_{s,n}\right)c_s^T - c_s\left(\sum_n \gamma_{s,n}y_n\right)^T -$$

$$c_s\left(\sum_n \gamma_{s,n}\rho_{s,n}\right)^T C_s^T + \left(\sum_n \gamma_{s,n}\right)c_s c_s^T.$$

SPEECH SPECIFIC ISSUES

There are a number of important issues to be solved before the above algorithms can be applied to speech, and they are discussed here.

1. PARAMETER INITIALIZATION

It is important to initialize the parameters appropriately for an iterative local optimization procedure such as EM. The HDM approach of the system 100 enjoys the benefit of being closely related to speech-specific knowledge and some key parameters, especially the phone targets, can be reliably initialized from a formant synthesizer. Due to the small number of total parameters, others can be easily initialized by a small amount of hand-labeled VTR data.

2. SEGMENTAL CONSTRAiNT

The probabilistic form of the HDM allows phone transitions to occur at each frame, which is undesirable for speech. In training, a series of time-varying transition matrices $\pi_{ss'}$ can be constructed based on the given phonetic transcript (or one created from a lexicon if only word transcripts are given) and some initial segmentation to impose the segmental constraint and force the discrete-state component of the model to be consistent with the phonetic transcript. In one example, the forced alignment phone boundary provided by HMM training is perturbed by three frames or to the middle of the adjacent phones, whichever is less. Such an approach also greatly reduces the number of possible phones that have to be summed up at each time step, including Equations (8)-(10), (22)-(24) and the calculation of all the $f$s. The segmental constraint in recognition is discussed below.

3. HIDDEN DYNAMICS RECOVERY

It is both informative (especially for debugging) and desirable to recover the hidden VTR, and it is calculated by:

$$\hat{x}_n = \sum_s \gamma_{s,n} \rho_{s,n} \qquad (33)$$

for both the MOG and HMM posterior assumptions.

4. RECOGNITION STRATEGY

Here we seek the most likely phone sequence given a sequence of observation. For the MOG case, this is simply accomplished by choosing the maximum γ at each frame; while for the HMM posterior, Viterbi decoding is performed by using γ and η, for example, the initialization and induction equation for the scoring are:

$$V_1(s) = \gamma_{s,1}, V_n(s') = \max_{1 \le s \le S} \lfloor V_{n-1}(s)\eta_{ss',n} \rfloor. \qquad (34)$$

It is highly desirable to incorporate segmental (or minimal duration) constraint and language weighting in the recognition stage and this is implemented by Viterbi decoding with modified transition matrices for both cases (in MOG) the transition matrix is created from scratch while in HMM the changes are merged into η. Such a strategy allows HDM to be used in phone recognition directly without resorting to an N-best list provided by HMM.

EXPERIMENTAL RESULTS

Figure 3:
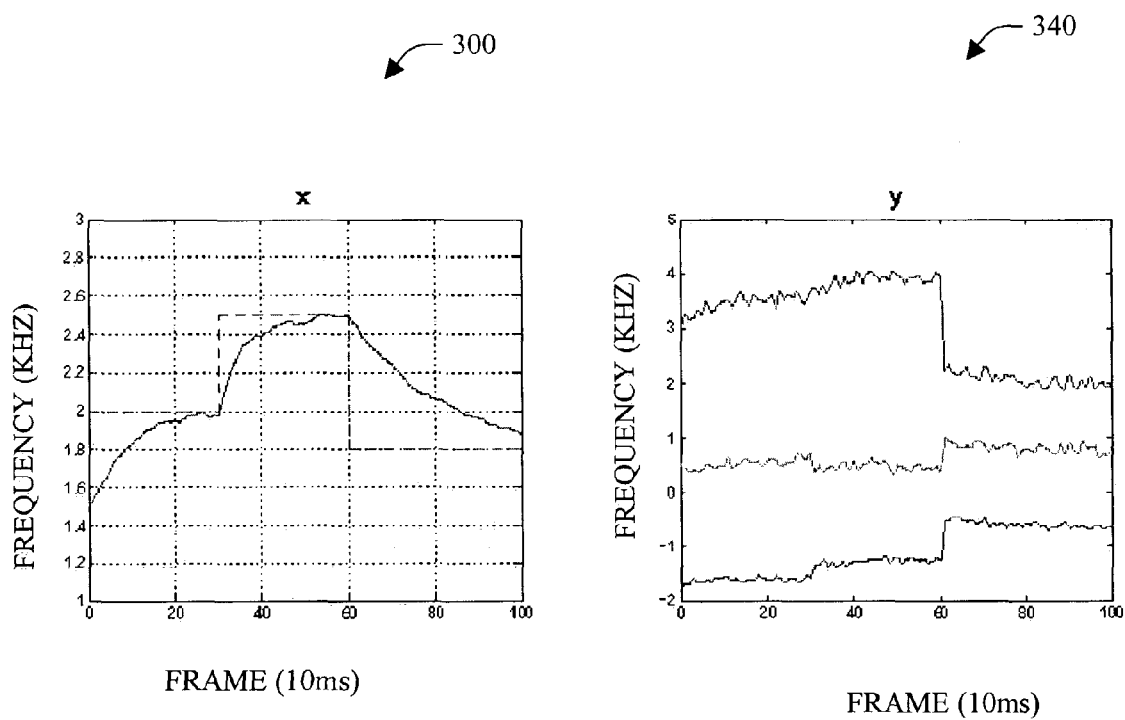
FIG. 3 depicts exemplary simulation training data in accordance with an aspect of the present invention.
Figure 4:
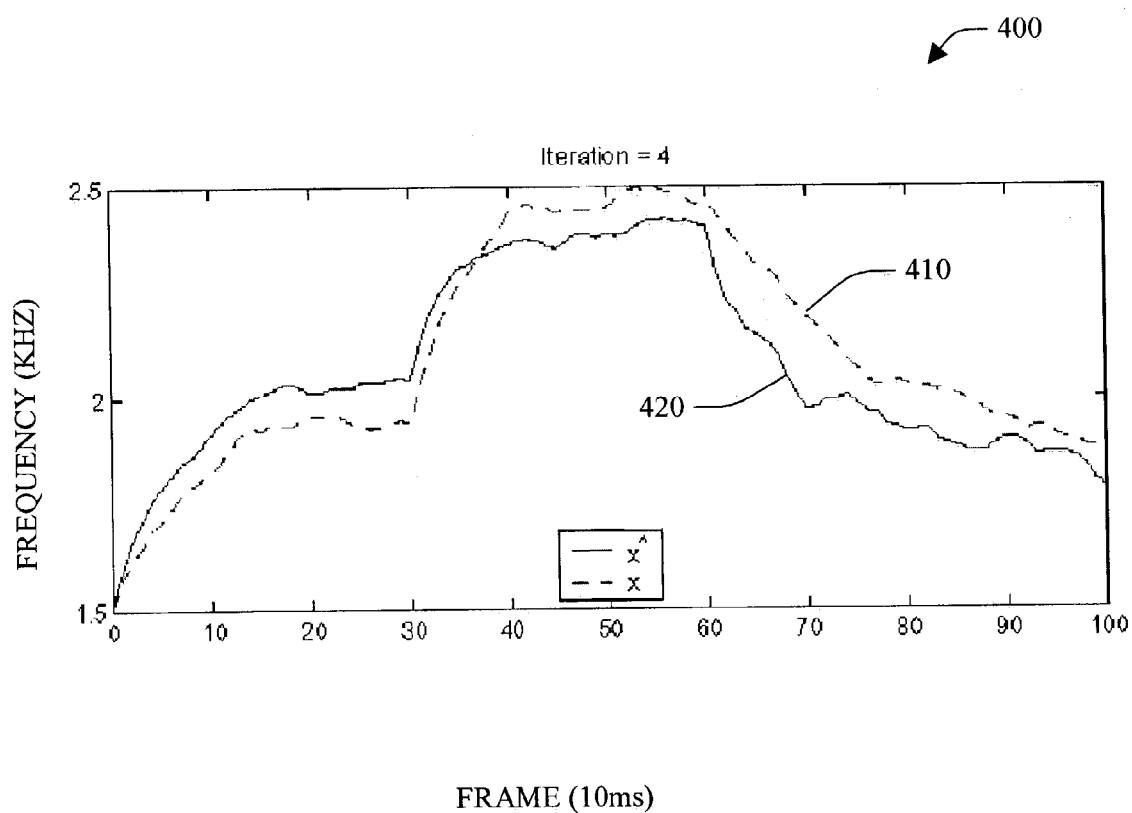
FIG. 4 depicts hidden dynamic recovery for the simulation data of FIG. 2 in accordance with an aspect of the present invention.

The results presented in this section are obtained by running the variational EM algorithm with MOG posterior. The correctness of implementation and effectiveness of the algorithm is first verified by simulation data. An example is shown in FIGS. 3 and 4. FIG. 3 shows one of the training tokens (10 in total) with three dynamic regimes (or phones). Only the observation y 340 is passed to the variational EM algorithm and the model parameters are initialized to be away from the true ones. After the algorithm converges, it learns the parameters quite well, for example, the true and estimated parameters for the state equation 300 are:

$A = [0:9\ 0:85\ 0:95], \hat{A} = [0:8922\ 0:7212\ 0:8623],$ $u = [2:0\ 2:5\ 1:8], \hat{u} = [2:0617\ 2:4011\ 1:8316],$ FIG. 4 shows the hidden dynamics recovery 400 for a test sequence, and the underlying phone sequence is also recognized perfectly for this simple example. The broken line 410 represents the true speech; the solid line 420 represents the estimated speech in accordance with an aspect of the present invention.

Figure 5:
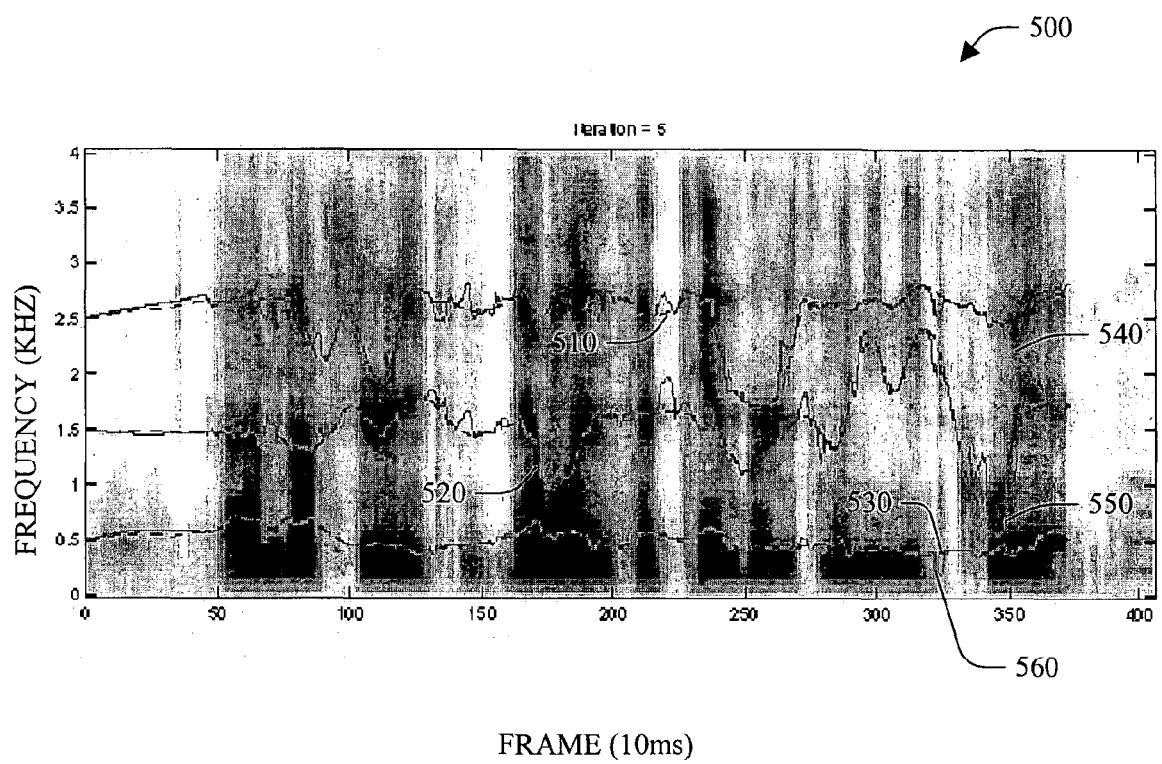
FIG. 5 depicts hidden dynamics recovery for training data in accordance with an aspect of the present invention.
Figure 6:
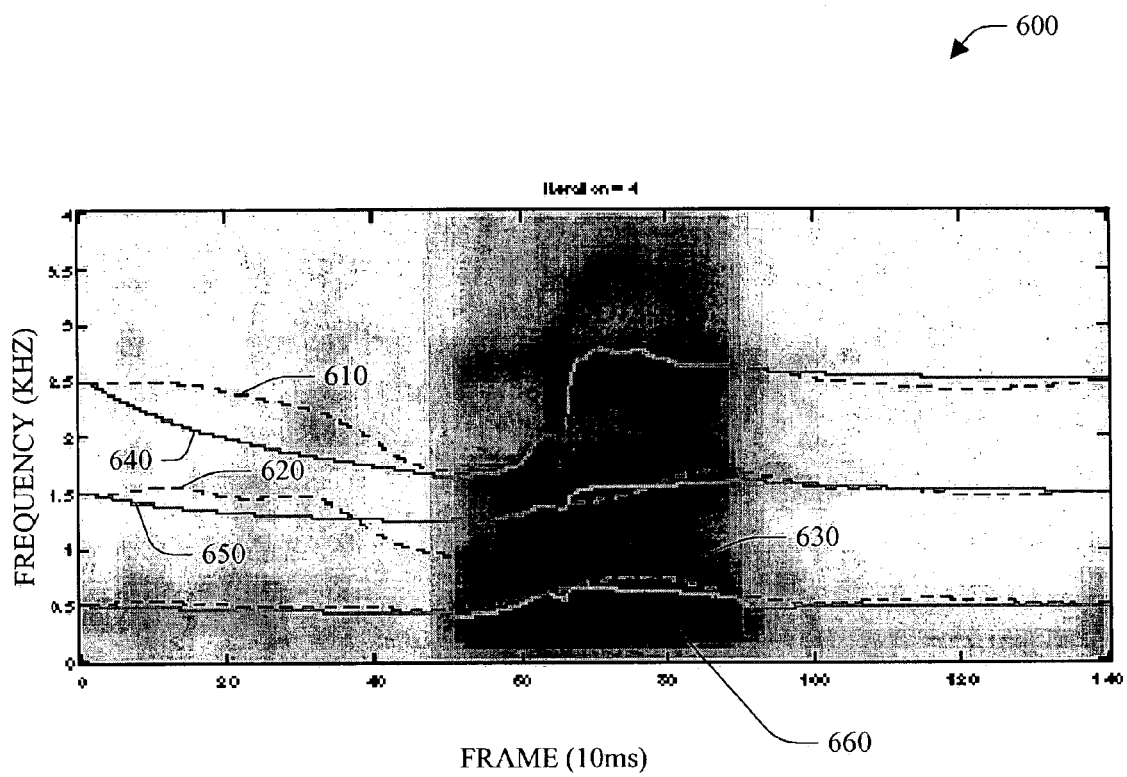
FIG. 6 depicts the hidden dynamics recovery for test data in accordance with an aspect of the present invention.

Similar experiments have been performed on a small amount of speech data from the Switchboard database. FIG. 5 shows the hidden dynamics (VTR) recovery for one of the five training sentences used, and the same is shown for a short test sentence in FIG. 6. The broken lines 510, 520, 530 depict hand-labeled VTR; the solid lines 540, 550, 560 depict estimated VTR generated in accordance with an aspect of the present invention. Similarly, the broken lines 610, 620, 630 depicted hand-labeled VTR; the solid lines 640, 650, 660 depicted estimated VTR generated in accordance with an aspect of the present invention.

By applying simple minimum duration constraint and adjusting the variance level of silence (also modeled as a phone but it needs some special treatment since it doesn't really fit into the state equation of HDM), the phone sequence is recognized perfectly for this simple task.

While FIG. 1 is a block diagram illustrating components for the system 100, it is to be appreciated that the system 100, the input component 110 and/or the model component 120 can be implemented as one or more computer components, as that term is defined herein. Thus, it is to be appreciated that computer executable components operable to implement the system 100, the input component 110 and/or the model component 120, can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 7:
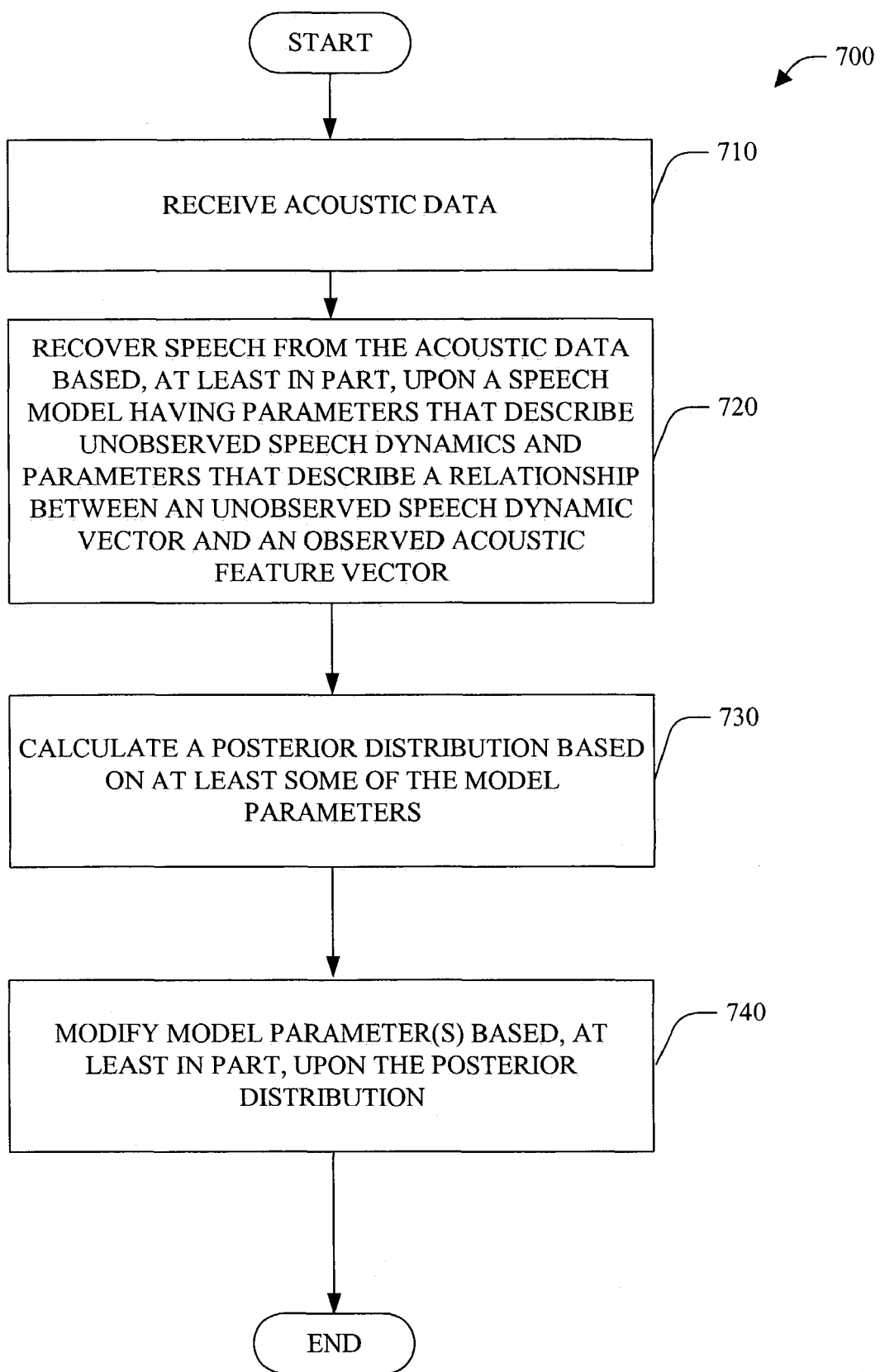
FIG. 7 is a flow chart of a method that facilitates modeling speech dynamics in accordance with an aspect of the present invention.
Figure 8:
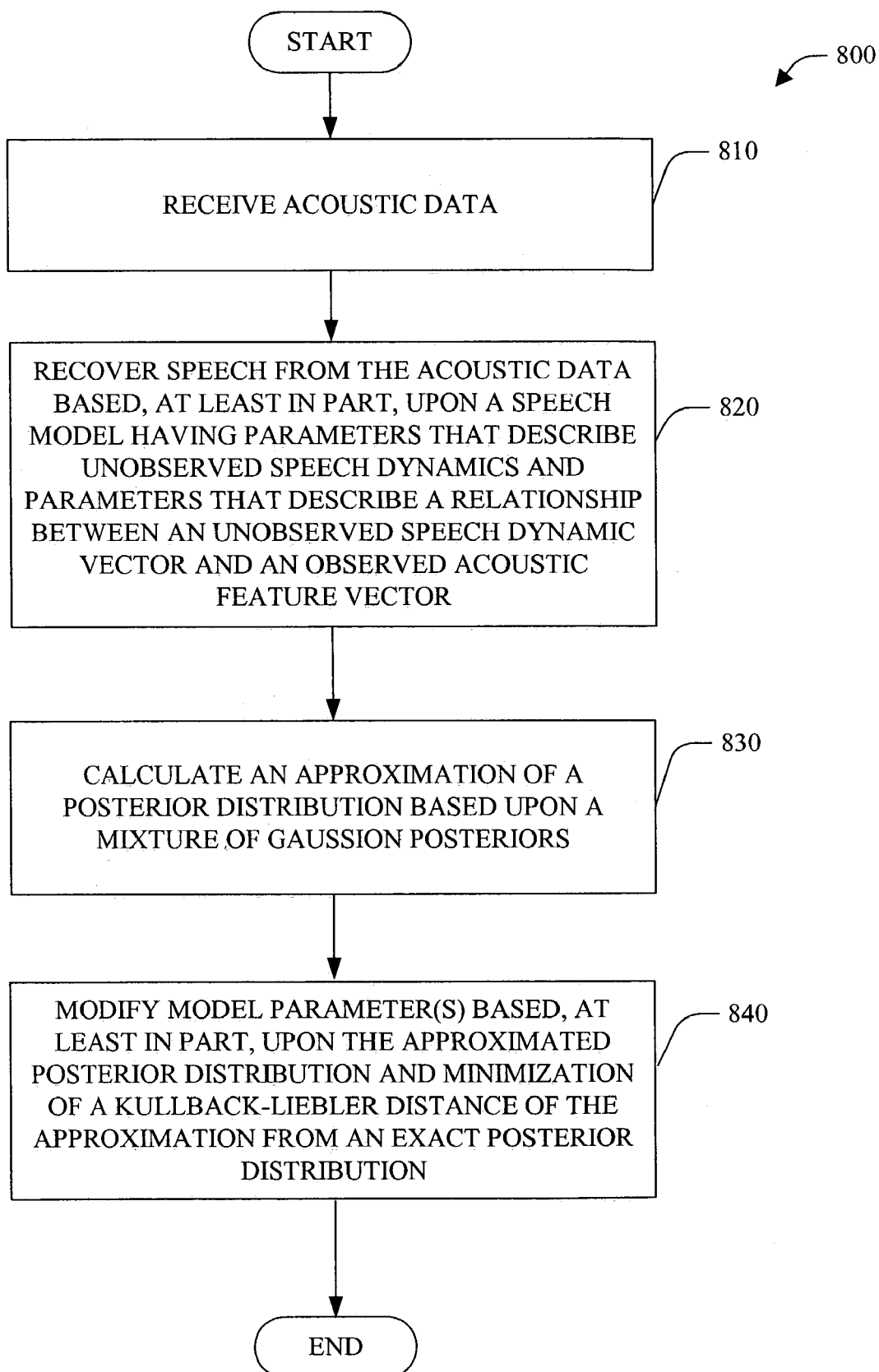
FIG. 8 is a flow chart of a method that facilitates modeling speech dynamics in accordance with an aspect of the present invention.
Figure 9:
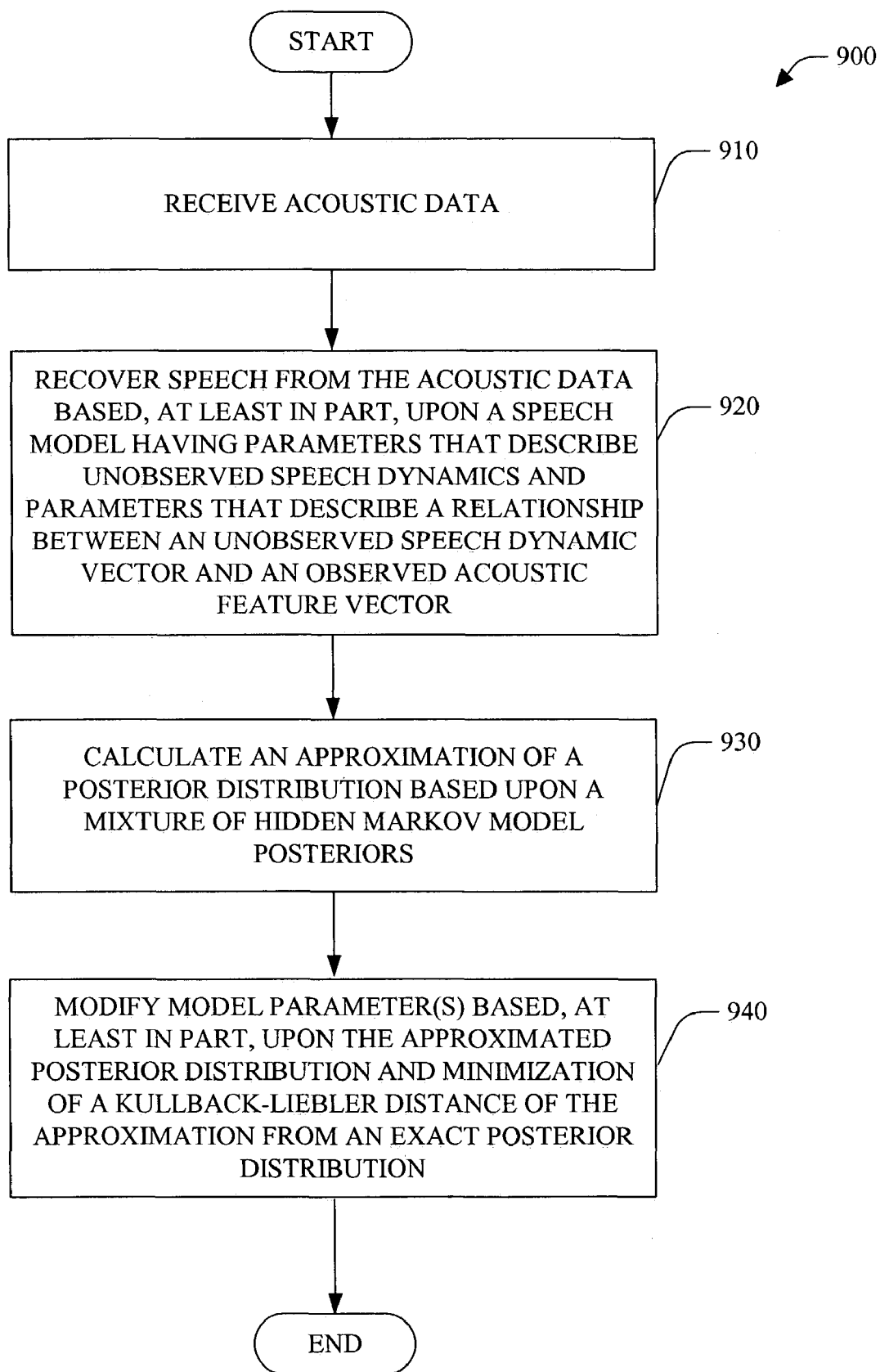
FIG. 9 is a flow chart of a method that facilitates modeling speech dynamics in accordance with an aspect of the present invention.

Turning briefly to FIGS. 7, 8 and 9, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method 700 that facilitates modeling speech dynamics in accordance with an aspect of the present invention is illustrated. At 710, acoustic data is received. At 720, speech is recovered from the acoustic data based, at least in part, upon a speech model having parameters that describe unobserved speech dynamics and parameters that describe a relationship between an unobserved speech dynamic vector and an observed acoustic feature vector. At 730, a posterior distribution based on at least some of the model parameters is calculated. At 740, the model parameter(s) are modified based, at least in part, upon the calculated posterior distribution.

Next, turning to FIG. 8, a method 800 that facilitates modeling speech dynamics in accordance with an aspect of the present invention is illustrated. At 810, acoustic data is received. At 820, speech is recovered from the acoustic data based, at least in part, upon a speech model having parameters that describe unobserved speech dynamics and parameters that describe a relationship between an unobserved speech dynamics vector and an observed acoustic feature vector.

At 830, an approximation of a posterior distribution based upon a mixture of Gaussian posteriors is calculated. For example, calculation of the approximation of the posterior distribution can be based, at least in part, upon Equation (5). At 840, the model parameter(s) are modified based, at least in part, upon the calculated approximated posterior distribution and minimization of a Kullback-Leibler distance of the approximation from an exact posterior distribution.

Referring to FIG. 9, a method 900 that facilitates modeling speech dynamics in accordance with an aspect of the present invention is illustrated. At 910, acoustic data is received. At 920, speech is recovered from the acoustic data based, at least in part, upon a speech model having parameters that describe unobserved speech dynamics and parameters that describe a relationship between an unobserved speech dynamics vector and an observed acoustic feature vector. At 930, an approximation of a posterior distribution based upon a mixture of hidden Markov model posteriors is calculated. For example, calculation of the approximation of the posterior distribution can be based, at least in part, upon Equation (20). At 940, the model parameter(s) are modified based, at least in part, upon the calculated approximated posterior distribution and minimization of a Kuliback-Leibler distance of the approximation from an exact posterior distribution.

Figure 10:
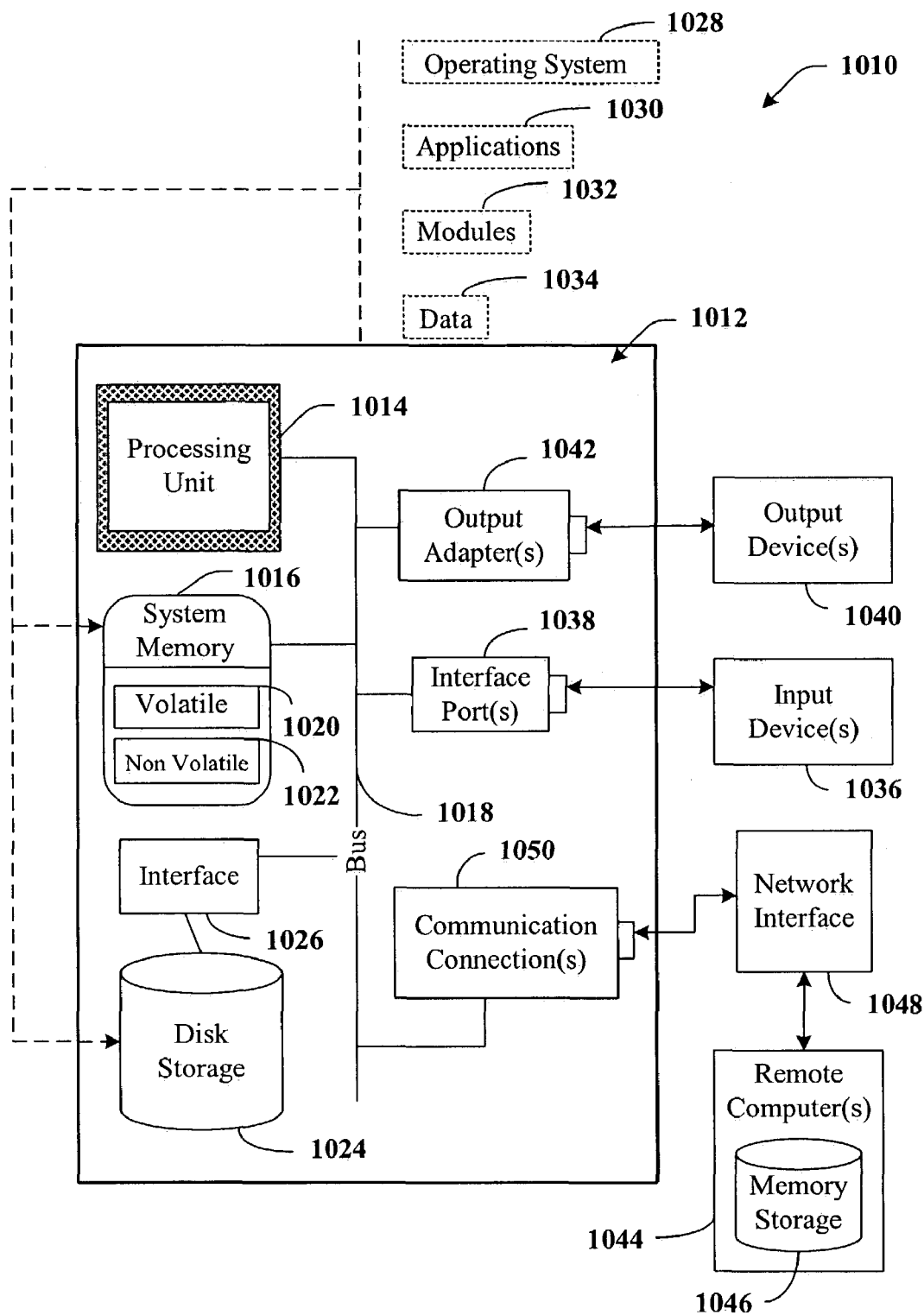
FIG. 10 illustrates an example operating environment in which the present invention may function.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera; and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s)

1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates speech recognition by modeling speech dynamics, comprising:
    an input component that receives acoustic data; and
    a model component that employs the acoustic data to characterize speech, the model component comprising model parameters that form a mapping relationship from unobserved speech dynamics to observed speech acoustics, the model parameters are employed to decode an unobserved phone sequence of speech based, at least in part, upon a variational learning technique;
    wherein the model component is based, at least in part, upon a hidden dynamic model in the form of a segmental switching state space model, the segmental switching state space model comprises respective states having respective durations in time corresponding to soft boundaries of respective phones in the unobserved phone sequence.

2. The system of claim 1, modification of at least one of the model parameters being based upon a variational expectation maximization algorithm having an E-step and M-step.

3. The system of claim 2, modification of at least one of the model parameters being based, at least in part, upon a mixture of Gaussian (MOG) posteriors based on a variational technique.

4. The system of claim 3, the model component being based, at least in part, upon:

$$q(s_{1:N}, x_{1:N}) = \prod_n q(x_n | s_n) q(s_n),$$

where x is a state of the model,
s is a phone index,
n is a frame number,
N is a number of frames to be analyzed, and
q is a probability approximation.

5. The system of claim 2, modification of at least one of the model parameters being based, at least in part, upon a mixture of hidden Markov model (HMM) posteriors based on a variational technique.

6. The system of claim 1, the model component selecting an approximate posterior distribution relating to the acoustic data and optimizing a posterior distribution by minimizing a Kullback-Leibler (KB) distance thereof to an exact posterior distribution.

7. The system of claim 1, the model component employing, at least in part, the state equation:

$$x_n = A_s x_{n-1} + (I - A_s) u_s + w,$$

and the observation equation:

$$y_n = C_s x_n + c_s + v,$$

where n is a frame number,
s is a phone index,
x is the hidden dynamics,
y is an acoustic feature vector,
v is Gaussian white noise,
w is Gaussian white noise,
A is a phone dependent system matrix,
I is an identity matrix,
u is a target vector, and
C and c are parameters for mapping from x to y.

8. The system of claim 1, the model component being expressed, at least in part, in terms of probability distributions:

$$p(s_n = s | s_{n-1} = s') = \pi_{s's},$$

$$p(x_n | s_n = s, x_{n-1}) = N(x_n | A_s x_{n-1} = a_s, B_s),$$

$$p(y_n | s_n = s, x_n = s, x_n) = N(y_n | C_s x_n = c_s, D_s),$$

where $\pi_{s's}$ is a phone transition probability matrix, $a_s = (I - A_x) u_s$, where $A_x$ is a phone dependent system matrix, I is an identity matrix, and u is a target vector,
N denotes a Gaussian distribution with mean and precision matrix as the parameters,
A and a are parameters for mapping from a state of x at a given frame to a state of x at an immediately following frame,
B represents a covariance matrix of a residual vector after the mapping from a state of x at a given frame to a state of x at an immediately following frame, C and c are parameters for mapping from x to y, and,
D represents a covariance matrix of a residual vector after the mapping from x to y.

9. A method that facilitates modeling speech dynamics in a speech recognition system comprising:
  decoding an unobserved phone sequence of speech from acoustic data based, at least in part, upon a speech model, the speech model based upon a hidden dynamic model in the form of a segmental switching state space model, comprising one or more states corresponding to respective phones in the unobserved phone sequence having respective durations corresponding to estimated soft boundaries for the phones, and further comprising at least two sets of parameters, a first set of model parameters describing unobserved speech dynamics and a second set of model parameters describing a relationship between an unobserved speech dynamic vector and an observed acoustic feature vector;
  calculating a posterior distribution based on at least the first set of model parameters and the second set of model parameters; and,
  modifying at least one of the model parameters based, at least in part, upon the calculated posterior distribution.

10. A method of modeling speech dynamics from acoustic data for speech recognition comprising:
  recovering a phone sequence of speech from acoustic data based, at least in part, upon a speech model, wherein the speech model is a segmental switching state space model and comprises a plurality of model parameters and one or more states corresponding to respective phones in the phone sequence created by segmenting the speech model in time based on estimated soft boundaries for the phones;
  calculating an approximation of a posterior distribution based on the model parameters, the model parameters and the approximation based upon a mixture of Gaussians; and,
  modifying at least one model parameter based, at least in part, upon the calculated approximated posterior distribution and minimization of a Kullback-Leibler distance of the approximation from an exact posterior distribution.

11. The method of claim 10, calculation of the approximation of the posterior distribution being based, at least in part, upon:

$$q(s_{1:N}, x_{1:N}) = \prod_n q(x_n | s_n) q(s_n),$$

where x is a state of the model,
s is a phone index,
n is a frame number,
N is a number of frames to be analyzed, and
q is a posterior probability approximation.

12. A method that facilitates creating a model of speech dynamics for a speech recognition application comprising:
  recovering a phone sequence of speech from acoustic data based, at least in part, upon a speech model in the form of a segmental switching state space model comprising one or more states respectively corresponding to the phone sequence, the states are generated by segmenting the speech model in time based on soft boundaries for respective phones in the phone sequence;
  calculating an approximation of a posterior distribution based on model parameters, the model parameters and the approximation based upon a hidden Markov model posterior; and,
  modifying at least one of the model parameters based, at least in part, upon the calculated approximated posterior distribution and minimization of a Kullback-Leibler distance of the approximation from an exact posterior distribution.

13. The method of claim 12, calculation of the approximation of the posterior distribution being based, at least in part, upon:

$$q(s_{1:N}, x_{1:N}) = \prod_{n=1}^{N} q(x_n | s_n) \cdot \prod_{n=2}^{N} q(s_n | s_{n-1}) \cdot q(s_1),$$

where x is a state of the model,
s is a phone index,
n is a frame number,
N is a number of frames to be analyzed, and
q is a posterior probability approximation.

14. A computer readable medium containing computer executable instructions operable to perform a method of modeling speech dynamics comprising:
  receiving acoustic data;
  modeling speech based on a segmental switching state space model comprising a first set of parameters that describe unobserved speech dynamics, a second set of parameters that describe a relationship between the unobserved speech dynamic vector and an observed acoustic feature vector, and a set of states having respective durations corresponding to soft phone boundaries determined from the acoustic data; and
  modifying at least one of the first set of parameters and the second set of parameters based, at least in part, upon a variational learning technique.

15. A system that facilitates modeling speech dynamics comprising:
  means for receiving acoustic data; and,
  means for characterizing speech as a segmental switching state space model based, at least in part, upon the acoustic data,
  wherein the means for modeling speech employs model parameters that are modified based, at least in part, upon a variational learning technique and one or more states having respective durations corresponding to estimated soft phone boundaries.

16. The system of claim 1, wherein the hidden dynamic model comprises a series of time-varying transition matrices based on the unobserved phone sequence to constrain the durations of the respective states to the estimated soft boundaries of the respective phones in the unobserved phone sequence, thereby forcing the respective states to be consistent in time with the unobserved phone sequence.

17. The system of claim 1, wherein the unobserved speech dynamics are vocal tract resonances associated with movement of an articulator.

18. The system of claim 2, wherein the modification of at least one of the model parameters is based on a multimodal posterior distribution and a variational technique for processing the multimodal posterior distribution.

19. The method of claim 9, wherein the unobserved speech dynamics comprise vocal tract resonance frequency parameters.

20. The method of claim 9, wherein the calculating a posterior distribution includes calculating a multimodal posterior distribution based on the first set of model parameters and the second set of model parameters and the modifying includes modifying at least one of the model parameters based on the multimodal posterior distribution and calculus of variation.

21. A method of modeling speech dynamics for a speech processing application, comprising:
constructing a speech model, the speech model is based on a hidden dynamic model in the form of a segmental switching state space model for speech applications, the constructing a speech model comprising:
initializing a first set of model parameters that describes unobserved vocal tract resonance frequencies;
initializing a second set of model parameters that describes a mapping relationship between the unobserved vocal tract resonance frequencies and observed acoustic data;
creating a state equation based on the first set of model parameters to express the unobserved vocal tract resonance frequencies as a set of states respectively corresponding to phones in an unobserved phonetic transcript, the state equation is a linear dynamic equation that describes transitions between states in the set of states in terms of a phone-dependent system matrix and a target vector and includes a first Gaussian noise parameter;
creating an observation equation that utilizes the first set of model parameters and the second set of model parameters to represent a phone-dependent mapping between the unobserved vocal tract resonance frequencies and the observed acoustic data, the mapping selected from the group consisting of a linear mapping and a piecewise linear mapping within respective phones, the observation equation includes a second Gaussian noise parameter;
estimating soft phone boundaries for phones in the unobserved phonetic transcript under an expectation-maximization (EM) framework; and
constructing a series of time-varying transition matrices based on the phonetic transcript to constrain the set of states to respective time durations corresponding to the estimated soft phone boundaries for phones in the phonetic transcript, thereby forcing the states to be consistent in time with the phonetic transcript;
calculating an estimated multimodal posterior distribution based on the constructed speech model, the first set of model parameters, and the second set of model parameters; and
modifying one or more model parameters to minimize a Kullback-Leibler distance from the estimated multimodal posterior distribution to an exact posterior distribution, the modifying is based on an EM framework having an expectation step of model inference and a maximization step of model learning, the model learning is based on a variational learning technique that employs calculus of variation.

* * * * *